June 14, 1927.
H. OSTERMANN
TOASTER
Filed Oct. 24, 1925
1,632,192
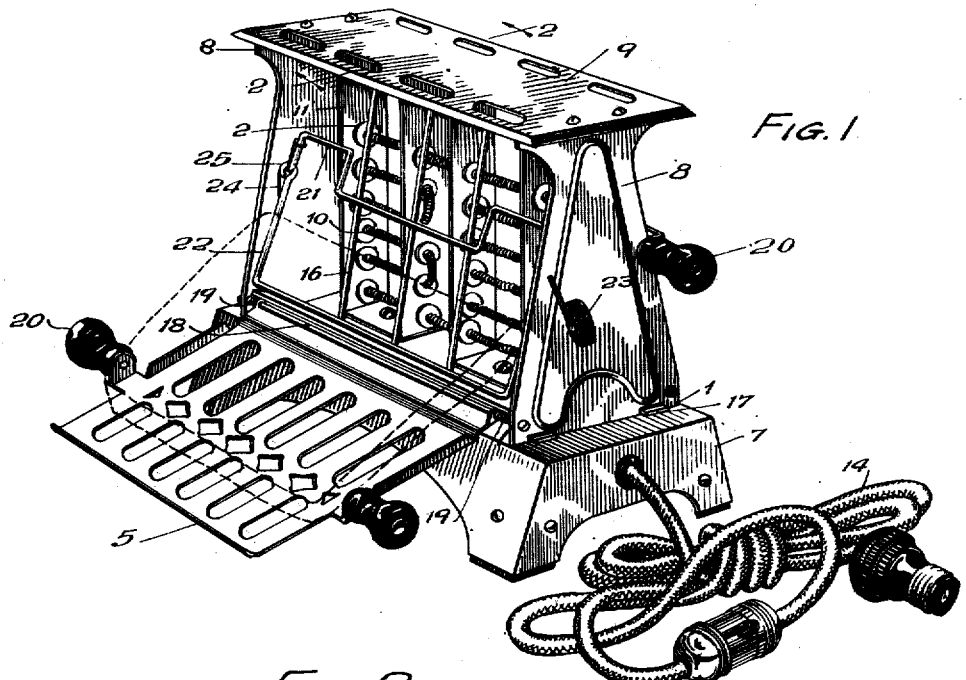
Fig. 1
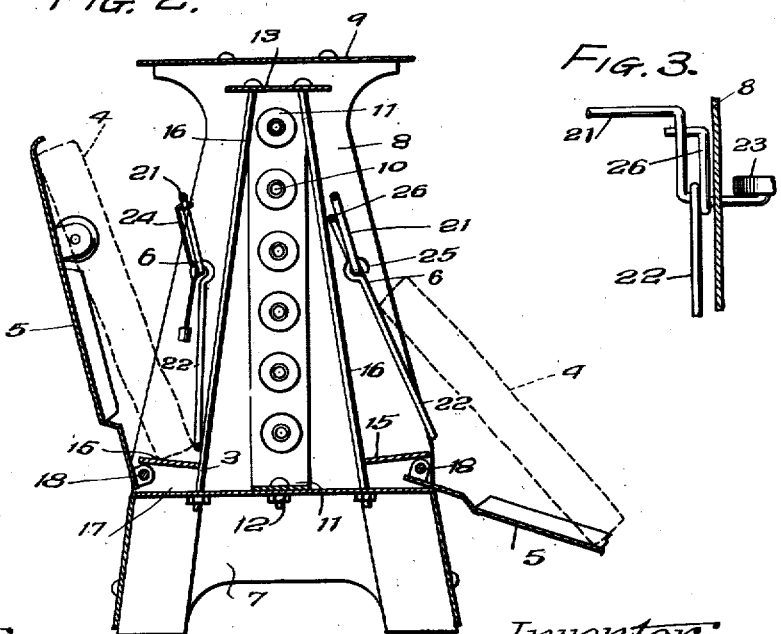
Fig. 2.
Fig. 3.
Witnesses:
Inventor:
Henry Ostermann,
By Rummler & Rummler,
Attys Patented June 14, 1927.

1,632,192

UNITED STATES PATENT OFFICE.

HENRY OSTERMANN, OF CHICAGO, ILLINOIS.

TOASTER.

Application filed October 24, 1925. Serial No. 64,578.

This invention relates to toasters and particularly electric toasters for toasting bread.

The main objects of this invention are to provide a toaster having improved means for supporting a slice of bread in an upright position adjacent to the heating element; to provide supporting means of this kind which will permit the slice of bread to be readily tilted away from the heating element for inspection; and to provide improved mechanism for flipping the bread to reverse its position on the supporting means so as to present the other side thereof to the heating element.

An illustrative embodiment of this invention is shown in the accompanying drawing, wherein:—

Figure 1 is a perspective view of an electric toaster to which this invention is applied, a slice of bread being shown in dotted outline.

Fig. 2 is a transverse vertical section, taken on the line 2—2 of Figure 1, two slices of bread being shown in dotted outline; the slice on the left hand side being shown in position for inspection and the one on the right hand side being shown in the process of being reversed.

Fig. 3 is an enlarged fragmentary detail of the tilting and reversing mechanism.

In the specific construction herein shown, the improved toaster comprises a frame or housing in which is mounted an upright heating unit and which is provided with means on opposite sides of the heating unit for supporting two slices of bread in position to expose the opposed inner faces thereof to the heating element. A pair of hinged gates are arranged at respectively opposite sides of the frame in position to engage the outer faces of the slices. Located between the heating unit and each of the gates, is improved mechanism arranged to act upon the exposed face of the slice for tilting the slice away from the heating unit to permit inspection of the exposed inner face and adapted also to flip the slice for reversing its position on the supporting means, whereby its other face is presented to the heating element.

In the construction herein shown, the improved toaster comprises a frame 1, in which is mounted a heating unit 2, and which is provided with improved supporting means 3 arranged for supporting two slices of bread 4 on edge with the inner faces thereof exposed to the heating element. Arranged at respectively opposite sides of the frame 1, is a pair of hinged gates 5, which are hinged along the lower edges thereof on substantially horizontal axes so that the upper edges thereof are movable toward and away from the heating unit. Located between the heating unit 2 and each of the gates 5, is improved mechanism 6 arranged to tilt the slice outwardly for inspection and to flip the slice for reversing its position relative to the heating element.

In the form shown, the frame 1 comprises a supporting base 7, on which is mounted a pair of substantially parallel end plates 8, which are connected together at their upper ends by a top plate 9, which may serve as a shelf for supporting a toasted slice of bread to keep it warm.

The present invention is applicable to toasters employing any form of heating means but, in the specific construction herein shown, the invention is applied to an electric toaster. The heating unit 2 comprises an electric resistance element 10, mounted on a pair of U-shaped supporting bars 11 and from which it is suitably insulated. The U-shaped supporting bars 11 are rigidly secured to the base 7 by bolts 12 or other suitable fastening means and their upper ends are connected together by a substantially horizontal plate 13. Electric current is supplied to the heating element 10 through the usual cord 14.

In the construction herein shown, each of the supporting means 3 comprises a substantially horizontal shelf 15 mounted on the base 7 for supporting the lower edge of the slice and a substantially upright grid 16. The shelves 15 extend substantially the full distance between the two end plates 8 and are provided with downwardly projecting lugs 17 which are arranged to space the shelves above the base 7 and which extend outwardly through notches in the end walls 8. The grid 16 consists of a plurality of substantially parallel wires secured at their upper ends to the plate 13 and at their lower ends to the base 7.

In the form shown, the gates 5 are hinged along their lower edges to hinge pins 18 which are mounted in the end walls 8 and which are located between the shelves 15 and the base 7. Embracing the pins 18 adjacent to the ends thereof, are coiled springs 19 which are arranged to normally close the gates for holding the slices in position for toasting. Handles 20 are mounted on the ends of the gates to facilitate the manual operation thereof.

In the specific form shown, each of the improved tilting and flipping mechanisms 6 comprises a pair of wire wings 21 and 22, bent to the forms shown in Fig. 1, and adapted to act upon the inner exposed face of the slice 4. The ends of the wing 21 are pivoted in the walls 8 and one end thereof is formed to provide a crank handle 23. Arranged at the other end thereof, is a spring element 24 which normally urges the wing 21 outwardly for tilting the upper edge of the slice away from the heating unit when the gate 5 is swung outwardly to permit inspection of the exposed face of the slice. The wing 22 is suspended from the wing 21 and its ends are bent to form eyelets 25 which loosely embrace the ends of the wing 21. One end of the wing 22 projects upwardly to form a stop 26 which is located in the path of movement of the wing 21 so that, when the crank handle 23 is depressed to retract the wing 21, the wing 22 is simultaneously rocked outwardly to flip the slice onto the open gate.

In operation, the slice to be toasted is placed on edge on the supporting shelf 15 between the grid 16 and the gate 5. When the gate is opened slightly, the wing 21 moves outwardly so as to tilt the slice against the gate, thereby permitting inspection of the toasted face. When it is desired to reverse the slice, the handle 23 is held in a partially depressed position so as to prevent the wing 21 from tilting the slice when the gate is opened. While the gate is held in its fully open position, the handle 23 is further depressed so as to rock the wing 22 outwardly, thereby flipping the slice from the shelf 15 onto the open gate. When the gate is again closed, the slice moves onto the shelf 15 in a reverse position, with its opposite face exposed to the heating element.

Although but one specific embodiment of this invention has been herein shown and described, it is to be understood that numerous details of the construction shown may be altered or omitted without departing from the spirit of this invention as defined by the folowing claims:

I claim:

1. A toaster comprising a heating element, a hinged gate movable toward and away from said heating element, stationary means for supporting a slice of bread on edge between said heating element and gate, and manually operated mechanism adapted to engage the inner face of the slice for flipping the slice from said supporting means onto said gate while the latter occupies its open position whereby the slice is reversed in its position relative to said heating element upon the closing of said gate, said mechanism being normally inactive to permit said gate to be opened without flipping the slice.

2. A toaster comprising a heating element, a hinged gate movable toward and away from said heating element, stationary means for supporting a slice of bread on edge between said heating element and gate, and mechanism adapted to engage the inner face of the slice to tilt the slice away from said heating element when said gate is opened and also having a part manually movable into position for flipping the slice from said supporting means onto said gate while the latter is open whereby the slice is reversed in its position relative to said heating element upon the closing of said gate, said manually movable part being normally inactive to permit said gate to be opened without flipping the slice.

3. A toaster comprising a heating element, a hinged gate movable toward and away from said heating element, means for supporting a slice of bread on edge between said heating element and gate, and mechanism having a part adapted to tilt the upper edge of the slice away from said heating element when said gate is opened to permit inspection of the toasted side of said slice and having another part arranged for manual operation to flip the lower edge of the slice from said supporting means when said gate is open so as to reverse the position of said slice whereby its other side is exposed to said heating element upon the closing of said gate.

4. A toaster comprising a heating element, a hinged gate adapted to be swung on a substantially horizontal axis toward and away from said heating element, a stationary shelf located between said element and gate for supporting a slice of bread on edge, and mechanism having a manually operated part located adjacent to said shelf and arranged to engage the inner face of the slice for flipping the lower edge of the slice from said shelf so as to permit the slice to slide onto said gate while the latter is open whereby the slice is reversed in its position relative to said heating element upon the closing of said gate, said manually operated part being normally inactive to permit said gate to be opened without flipping the slice.

5. A toaster comprising a heating element, a hinged gate movable toward and away from said heating element, means for supporting a slice of bread on edge between said heating element and gate, means arranged to normally tilt the upper edge of the slice outwardly away from said heating element when said gate is opened, other means adapted to flip the upper edge of the slice from said supporting means onto said gate while the latter occupies its open position whereby the slice is reversed in its position relative to said heating element upon the closing of said gate, and a manually operable element arranged to actuate said flipping means and to hold said tilting means in an inoperative position.

6. A toaster comprising a heating element, a hinged gate movable toward and away from said heating element, means for supporting a slice of bread on edge between said heating element and gate, means arranged to normally tilt the upper edge of the slice outwardly away from said heating element when said gate is opened, other means adapted to flip the lower edge of the slice from said supporting means onto said gate while the latter occupies its open position whereby the slice is reversed in its position relative to said heating element upon the closing of said gate, and a single operating handle arranged to actuate said flipping means and to simultaneously hold said tilting means in an inoperative position.

7. A toaster comprising a heating element, a hinged gate adapted to be swung on a substantially horizontal axis toward and away from said heating element, a shelf located between said element and gate for supporting a slice of bread on edge, a pair of wings arranged to coact with one face of the slice, one of said wings being adapted to tilt the upper edge of the slice outwardly away from said heating element when said gate is opened, the other of said wings being adapted to flip the lower edge of the slice from said shelf to effect a reversal of the slice when said gate is open, and an operating element arranged to actuate said flipping wing and to retain said tilting wing in its inoperative position.

8. A toaster comprising a heating element, a substantially horizontal shelf adapted to support a slice of bread on edge with one face thereof exposed to said heating element, a gate hinged along one edge thereof adjacent said shelf and adapted to be swung into and out of position for holding the slice in its toasting position, a pair of wings located between said gate and heating element in position to coact with the exposed face of the slice, one of said wings being arranged to normally tilt the upper edge of the slice outwardly away from said heating element when said gate is open, the other of said wings being arranged to flip the lower edge of the slice from said shelf to permit the slice to slide onto said gate when the latter is open, and an operating handle arranged to actuate said flipping wing and to simultaneously hold said tilting wing inactive.

9. A toaster comprising a heating element, a substantially horizontal shelf adapted to support a slice of bread on edge with one face thereof exposed to said heating element, a gate hinged along one edge thereof adjacent said shelf and adapted to be swung into and out of position for holding the slice in its toasting position, a pair of wings located between said gate and heating element in position to coact with the exposed face of the slice, a spring arranged to normally urge one of said wings into position for tilting the upper edge of the slice outwardly away from said heating element when said gate is opened, the other of said wings being adapted to flip the lower edge of the slice from said shelf to permit the slice to slide onto said gate when the latter is open, and a crank handle arranged to actuate said flipping wing and to simultaneously retract said tilting wing against the action of said spring.

Signed at Chicago this 21st day of October, 1925.

HENRY OSTERMANN.

by the slice is reversed in its position relative to said heating element upon the closing of said gate, and a manually operable element arranged to actuate said flipping means and to hold said tilting means in an inoperative position.

6. A toaster comprising a heating element, a hinged gate movable toward and away from said heating element, means for supporting a slice of bread on edge between said heating element and gate, means arranged to normally tilt the upper edge of the slice outwardly away from said heating element when said gate is opened, other means adapted to flip the lower edge of the slice from said supporting means onto said gate while the latter occupies its open position whereby the slice is reversed in its position relative to said heating element upon the closing of said gate, and a single operating handle arranged to actuate said flipping means and to simultaneously hold said tilting means in an inoperative position.

7. A toaster comprising a heating element, a hinged gate adapted to be swung on a substantially horizontal axis toward and away from said heating element, a shelf located between said element and gate for supporting a slice of bread on edge, a pair of wings arranged to coact with one face of the slice, one of said wings being adapted to tilt the upper edge of the slice outwardly away from said heating element when said gate is opened, the other of said wings being adapted to flip the lower edge of the slice from said shelf to effect a reversal of the slice when said gate is open, and an operating element arranged to actuate said flipping wing and to retain said tilting wing in its inoperative position.

8. A toaster comprising a heating element, a substantially horizontal shelf adapted to support a slice of bread on edge with one face thereof exposed to said heating element, a gate hinged along one edge thereof adjacent said shelf and adapted to be swung into and out of position for holding the slice in its toasting position, a pair of wings located between said gate and heating element in position to coact with the exposed face of the slice, one of said wings being arranged to normally tilt the upper edge of the slice outwardly away from said heating element when said gate is open, the other of said wings being arranged to flip the lower edge of the slice from said shelf to permit the slice to slide onto said gate when the latter is open, and an operating handle arranged to actuate said flipping wing and to simultaneously hold said tilting wing inactive.

9. A toaster comprising a heating element, a substantially horizontal shelf adapted to support a slice of bread on edge with one face thereof exposed to said heating element, a gate hinged along one edge thereof adjacent said shelf and adapted to be swung into and out of position for holding the slice in its toasting position, a pair of wings located between said gate and heating element in position to coact with the exposed face of the slice, a spring arranged to normally urge one of said wings into position for tilting the upper edge of the slice outwardly away from said heating element when said gate is opened, the other of said wings being adapted to flip the lower edge of the slice from said shelf to permit the slice to slide onto said gate when the latter is open, and a crank handle arranged to actuate said flipping wing and to simultaneously retract said tilting wing against the action of said spring.

Signed at Chicago this 21st day of October, 1925.

HENRY OSTERMANN.

CERTIFICATE OF CORRECTION.

Patent No. 1,632,192.　　　　　　　　　　Granted June 14, 1927, to

HENRY OSTERMANN.

It is hereby certified that error appears in the printed specification of the above numbered patent requiring correction as follows: Page 2, line 128, claim 5, for the word "upper" read "lower"; and that the said Letters Patent should be read with this correction therein that the same may conform to the record of the case in the Patent Office.

Signed and sealed this 12th day of July, A. D. 1927.

Seal.

M. J. Moore,
Acting Commissioner of Patents.

CERTIFICATE OF CORRECTION.

Patent No. 1,632,192.            Granted June 14, 1927, to

HENRY OSTERMANN.

It is hereby certified that error appears in the printed specification of the above numbered patent requiring correction as follows: Page 2, line 128, claim 5, for the word "upper" read "lower"; and that the said Letters Patent should be read with this correction therein that the same may conform to the record of the case in the Patent Office.

Signed and sealed this 12th day of July, A. D. 1927.

Seal.

M. J. Moore,
Acting Commissioner of Patents.